July 23, 1963 — M. H. ESTKOWSKI — 3,098,320
MARKER SEED TABS
Filed Sept. 22, 1960 — 3 Sheets-Sheet 1
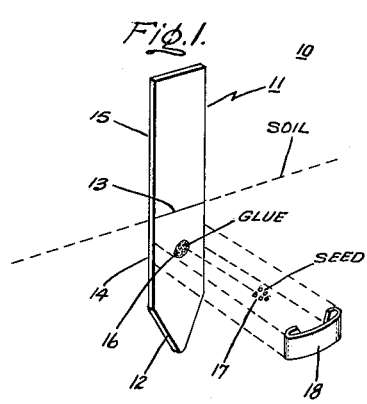
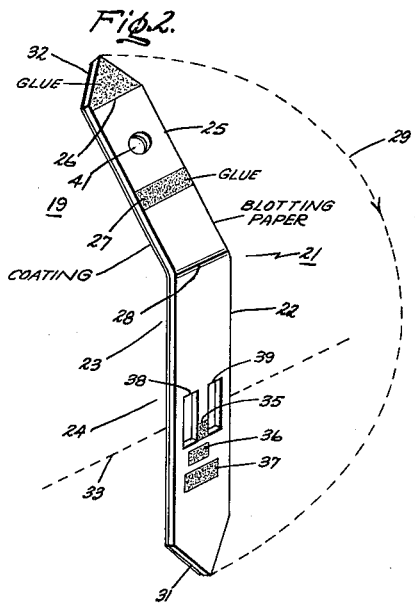
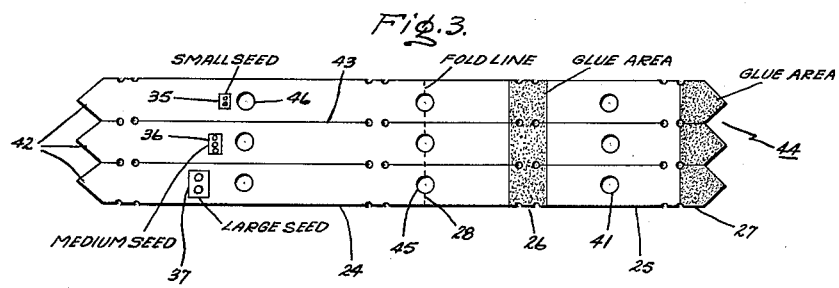
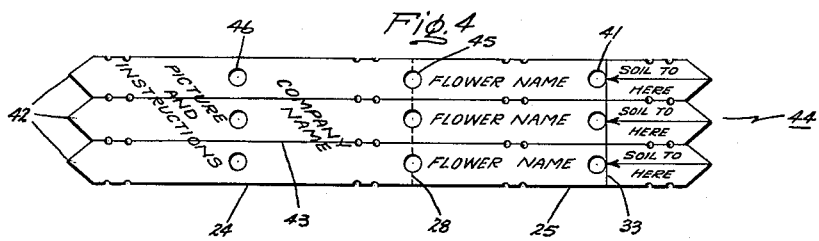
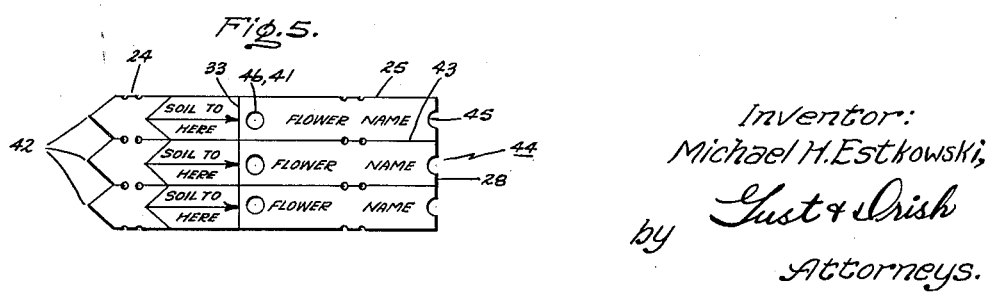
Inventor:
Michael H. Estkowski,
by Just & Drish
Attorneys.

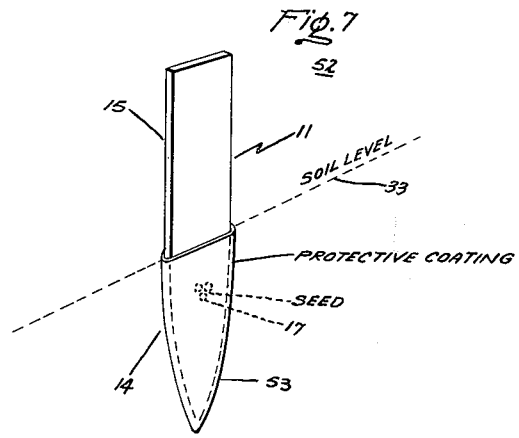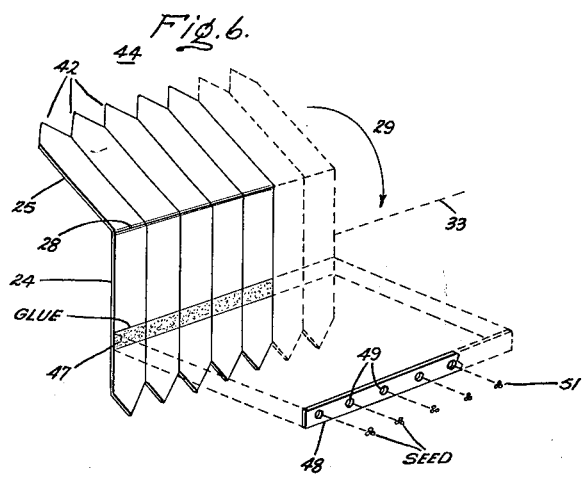

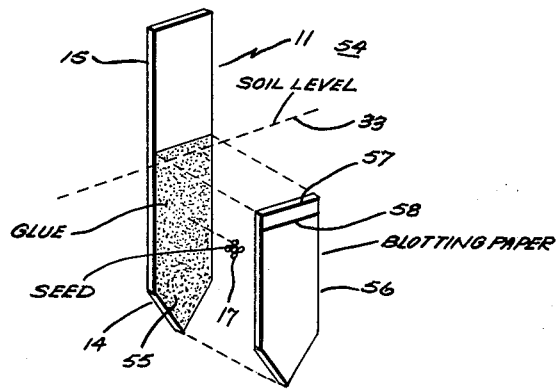
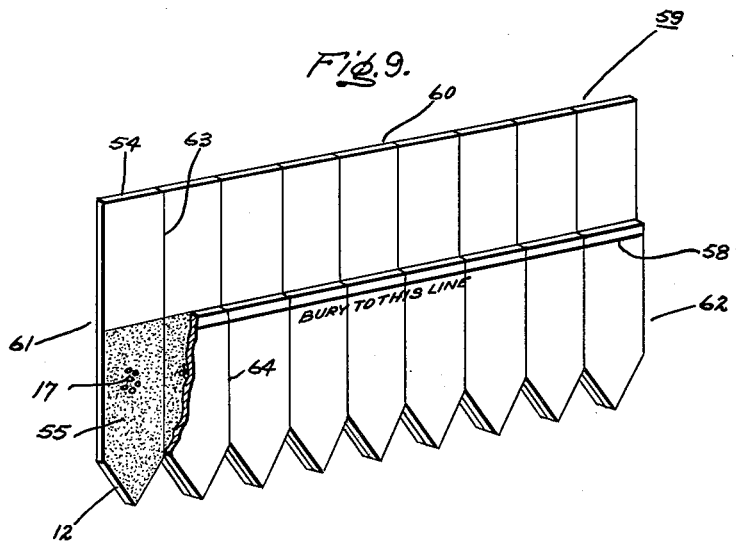

United States Patent Office 3,098,320
Patented July 23, 1963

3,098,320
MARKER SEED TABS
Michael H. Estkowski, Sun Valley, Calif.
(R.R. 2, P.O. Box 757, St. Joseph, Mich.)
Filed Sept. 22, 1960, Ser. No. 57,846
9 Claims. (Cl. 47—56)

This invention relates generally to the planting of seeds, such as flower, vegetable and tree seeds, and more particularly to an improved seed planting device which not only makes seed planting more simple and fool-proof than conventional methods of planting, but also simplifies after-planting care of the seed and resulting seedling and provides control over the environment immediately surrounding the seed. This application is a continuation-in-part of my application Serial No. 817,636 filed June 2, 1959, and now abandoned.

In accordance with conventional methods of planting small quantities of flower, vegetable or tree seeds in a garden, a small depression or hole is made in the soil to what is believed to be the correct depth for the particular type of seed being planted, and what is believed to be the correct quantity of seed is then deposited in the hole with the seed then being covered over with soil; frequently, a small tag or tab is positioned beside the planting location in order to identify the location and the type of seed being grown. It will be readily apparent that with such a planting method, there is considerable possibility for error, both in the depth of planting and the number of seeds planted. Furthermore, in the event that it is desired to apply seedling disease inhibiting chemicals and/or growth enhancing chemicals, such chemicals must be applied over a substantial area surrounding the planting location, it being difficult therefore to apply the correct amount of the chemical and there being appreciable wastage of the chemical and effort by virtue of applying the same to areas not needing such application. In addition, with such conventional seed planting methods, watering of the planted seed must be very carefully conducted in order to prevent washing away of small seeds. Many other inherent disadvantages are involved in such prior seed planting methods which are too well known to the average gardener to necessitate enumeration.

In addition to the foregoing, in the past, when seeds have been planted in seed flats, the seed has customarily been scattered at random in considerable quantity into the flat, thus requiring subsequent thinnning of the resulting seedlings.

It is therefore highly desirable to provide improved planting devices for facilitating domestic planting of flower and vegetable seeds which will substantially eliminate the difficulties which have inherently accompanied prior seed planting methods known to the present applicant.

It is accordingly an object of my invention to provide an improved seed planting device.

Another object of my invention is to provide an improved seed planting and marker device.

My invention in its broader aspects provides a seed planting device comprising a member having at least a portion of one surface area thereof coated with an adhesive material with a predetermined number of seeds adhered thereto. In one specific embodiment of my invention, the seed planting and marker device is provided comprising an elongated tab proportioned to have one end inserted in the soil at a predetermined level, with the other end thereof projecting above the soil. The one end of the tab has at least a portion of one surface thereof coated with adhesive material with a predetermined number of seeds adhered thereto. The correct planting level of the seed may then be marked on the tab by suitable indicia.

In accordance with a further embodiment of my invention, a layer of relatively thin porous and water absorbent material is secured to the surface of the planting device covering the seed and thereby protecting the same.

Further objects and advantages of my invention will become apparent by reference to the following description and the accompanying drawings, and the features of novelty which characterize this invention will be pointed out with particularity in the claims annexed to and forming a part of this specification.

In the drawings:

FIG. 1 is a view in perspective illustrating one embodiment of my invention;

FIG. 2 is a view in perspective illustrating another embodiment of my invention;

FIG. 3 is a view showing one side of still another embodiment of my invention;

FIG. 4 is a view showing the other side of the embodiment of FIG. 3;

FIG. 5 is a view showing one side of the device of FIGS. 3 and 4 as assembled;

FIG. 6 is a view in perspective showing a modification of my invention;

FIG. 7 is a view in perspective showing another modification of my invention;

FIG. 8 is an exploded view in perspective illustrating the preferred embodiment of my invention;

FIG. 9 is a view in perspective showing a plurality of the devices of FIG. 8 edgewise joined to form a single card.

Referring now to FIG. 1, an improved seed planting device of my invention, generally identified as 10, comprises an elongated, flat, relatively thin tab 11 formed of suitable relatively stiff material, such as a suitable plastic, wood, cardboard, or coated blotting paper. Tab 11 has its lower end 12 suitably pointed, as shown, and is adapted to be inserted in the soil to a predetermined level indicated by a line 13 printed, stamped, or otherwise suitably marked on one surface of tab 11. It is thus seen that the soil level-indicating line 13 transversely divides tab 11 into a lower end portion 14 which is inserted in the soil, and an upper end portion 15 which projects above the soil. Upper end portion 15 may have the name of the particular seed printed thereon or attached thereto together with any other necessary information. A small area 16 on the lower end portion 14 of tab 11 at a predetermined distance below soil level indicating line 13 is coated with a suitable glue or adhesive, and a predetermined number of seeds 17 are adhered to the adhesive area 16. It will now be readily seen that the adhesive area 16 is disposed at a level below the soil level indicating line 13 which is correct for a particular seed involved, and that the number of seeds 17 adhering to the adhesive area 16 is predetermined by the relative size of the glue area and the seed dimensions. In this way, the number of seeds adhering to the adhesive area 16 in the tab is under complete control. While the adhesive area 16 and seed 17 in FIG. 1 is shown as being below the soil level line since most seed is planted below soil level, some small seeds must be on the soil and thus the soil level line may be at or even below the adhesive area 16.

In order to protect the seed from becoming physically dislodged from the tab 11, a small piece 18 of suitable porous material such as gauze, paper, shredded paper, or material which becomes gelatinous upon absorbing water, which will permit the seedlings to poke through is secured to the surface of the lower end 14 of tab 11 thus protecting the seed so that it cannot be dislodged while the tab 11 is being handled or inserted into the soil.

Referring now to FIG. 2, the planting and marking device 19 is shown as being formed of an elongated tab 21 formed of relatively stiff blotting paper 22 coated on one side, as at 23. Tab 21 is transversely divided into a lower end portion 24 and an upper end portion 25, the upper end portion 25 being shown as being shorter in length than the lower end portion 24. Upper end portion 25 has two spaced-apart areas 26 and 27 on its blotting paper surface coated with suitable glue or adhesive, as shown. The upper end portion 25 is folded over as shown by the dashed line 29, along line 28, which may be a pre-formed crease, so that its blotting paper surface engages the blotting paper surface of the lower end portion 24 and is secured thereto by the adhesive areas 26 and 27. Ends 31 and 32 of the end portions 24 and 25 are suitably pointed, as shown, and the resulting folded device again is adapted to be inserted in the soil at a predetermined level 33, which may be indicated by a printed line (not shown) on the coated surface 23. The blotting paper surface of end portion 24 of tab 21 below soil level 33 is provided with one of three areas 35, 36 and 37 coated with suitable glue or adhesive material. It will be seen that the adhesive areas 35, 36 and 37 are progressively larger, and progressively disposed at greater depths below the soil level line 33. Thus, if the tab is to be employed with small seed, adhesive area 35 is provided, if the tab is to be employed with intermediate size seed, the adhesive area 36 is provided, and if the tab is to be employed with large seed, adhesive area 37 is provided; it will be understood that for any one tab, only one adhesive area will be provided. The required seed (not shown in FIG. 2), is then adhered to the adhesive area 35, 36 or 37 as the case may be in the manner of FIG. 1. After the seed has been suitably adhered to the adhesive area 35, 36 or 37, the upper portion 25 of the tab 21 is then folded over, and it will be seen that the seed is thus covered and therefore protected against dislodgement. In order to assist small seedlings to poke through, a pair of narrow slots 38 and 39 are provided extending through lower portion 24, these slots extending to a point above the soil level line 33. Furthermore, it will be seen that the provision of the transversely spaced apart narrow slots 38 and 39 defines the relatively small adhesive area 35 therebetween. In addition, another opening 41 is provided through the upper portion 25, opening 41 being in general alignment with soil level 33 when upper portion 25 is folded into operative position in engagement with lower portion 24 thereby to allow the seedlings of small seed to emerge into the air.

It will be readily seen that with the embodiment of FIG. 2, the blotting paper surfaces are adjacent in the folded tab and thus both outer surfaces of the resulting tab, being coated, are available for desired printed matter. It is further seen that the small openings 38, 39 and 41 are provided in order to allow small seedlings to emerge into the air with a minimum of resistance, however, in the case of larger seeds, it may not be necessary to provide some or all of the openings 38, 39 and 41. Furthermore, slots 38 and 39 may extend to the edges of the tab, if desired. It will also be seen that the elongated slots 38 and 39 make it possible to have a very small adhesive area 35 without requiring the provision of a similarly small adhesive dispenser opening, thus facilitating production of the device.

It will be readily seen that the blotting paper tabs 21 of FIG. 2 can readily be manufactured in the form of cards containing a number of preconnected tabs which can be torn off as used, as suggested in FIGS. 3, 4 and 5.

Referring now specifically to FIGS. 3, 4 and 5, in which another embodiment of my invention is shown, a plurality of tabs 42 are shown, again being preferably formed of coated blotting paper in the manner of the embodiment of FIG. 2. It will be seen that the tabs 42 are edge-joined, being shown as being partially separated by suitable slits 43 which may be formed in any suitable manner, as by a steel rule die, thus permitting the individual tabs 42 to be torn off from the composite card 44.

In FIGS. 3, 4 and 5, in which like elements are indicated by like reference numerals, openings 45 are formed in each tab on the fold line 28, thus facilitating folding of the upper end portion 25 onto the lower end portion 24. Furthermore, openings 46 are provided in the lower end portion 24 of each tab immediately above the soil level indicating line 33, openings 46 being respectively in alignment with the openings 41 in the upper end portions 25 of the tabs when the tab is folded to form its completed configuration, as seen in FIG. 5. Again, appropriate adhesive areas 35, 36 or 37 are provided at predetermined distances below the soil level line 33 for receiving small, medium and large seeds, as the case may be. In FIG. 3, three tabs 42 shown for illustrative purposes, are respectively shown as having a small adhesive area 35, a medium adhesive area 36 and a large adhesive area 37. However, it will be readily understood that ordinarily each card 44 of tabs 42 would have an adhesive area of only one size, i.e., for example a large seed adhesive area 37. In a specific seed planting marker tab in accordance with FIGS. 3-5, inclusive, each tab 42 had an unfolded overall length of 5 inches, a width of 5/16 inch and a length when folded of 2¾ inches, being formed of coated blotting paper of a weight referred to commercially as 120 lb. Royal Worcester Enameled Blotting—white on white.

Referring now to FIG. 6 in which like elements are still indicated by like reference numerals, there is shown a modification of my invention in which the size of the adhesive area and consequently the number of seeds adhering thereto can be conveniently controlled. Here, a plurality of edge-connected tabs 42, which may be of the type shown in FIGS. 2 through 5, inclusive, are provided with a relatively narrow transverse belt or band 47 of adhesive material extending transversely across the lower end portions 24, as shown; here the indicia indicating the soil level line 33 (not shown) may be placed on the reverse side of the tabs 42 at the desired distance from adhesive band 47. In the present embodiment, the size of the effective seed-receiving adhesive area of each tab 42 is controlled by providing an elongated strip 48 formed of paper or other suitable material having a plurality of punched holes 49 therein of the appropriate size to accommodate the number and type of seeds to be affixed to tabs 42; holes 49 are spaced apart a distance equal to the width of the respective tabs 42. The prepunched strip 48 is then applied to the tabs 42, being adhered to the adhesive belt 47 so that the punched holes 49 respectively expose the desired adhesive area on each of the tabs 42. Seed 51 is then positioned in the punched holes 49, being adhered to the adhesive of the strip 47 exposed thereby; this can be readily accomplished by merely inserting the card 44 in a container of seed and withdrawing the same, the requisite number of seed being retained in the openings 49 by virtue of their adherence with the respectively exposed portions of the adhesive strip 47. The embodiment of FIG. 6, therefore, eliminates the requirement for the use of an adhesive dispenser having means for accurately controlling the size of the adhesive area required in the previous embodiments. It will further be readily seen that the punched strip 48 can be formed of porous or absorbent material and readily treated with chemicals for enhancing seed germination and seedling growth. It will also be comprehended that in addition to varying the size of holes 49, the thickness of strip 48 and thus the depth of holes 49 may be varied thus to accommodate the desired number and/or size of seed.

Referring now to FIG. 7, another form of the improved seed planting and marker device is shown at 52, with like elements again being indicated by like reference numerals. Here, the tab 11 is formed in the same manner as the tab of FIG. 1 of plastic or other sufficiently stiff material to prevent its crumpling when it is inserted in the soil to the level 33. Again, a predetermined number and size of seeds 17 are adhered to a small area (not shown) of adhesive coated on the surface of the lower portion 14 of tab 11 a predetermined distance from soil level 33. In order to cover and protect seeds 17 in the embodiment of FIG. 7, the lower end 14 of tab 11 is completely coated or covered with a relatively thin layer 53 of water-absorbent material; the layer 53 may be applied to the lower end 14 of tab 11 by dipping in a manner similar to the dipping of match sticks. The water absorbent material 53 coats and protects seeds 17 during insertion of tab 11 into the soil, however, it becomes soft due to the moisture in the soil, thus allowing emergence of the sprouted seedling.

Referring now to FIG. 8, the preferred form of the improved seed planting and marker device of my invention is shown at 54, with like elements again being indicated by like reference numerals. Here, tab 11 is again formed of suitable relatively thin plastic or other sufficiently stiff supporting material to prevent its being crumpled when inserted in the soil to the level 33. In this embodiment, one surface of the entire lower portion 14 of tab 11 is coated with adhesive material, as at 55, with a predetermined number and size of seed 17 being adhered thereto at a predetermined distance below the soil level line 33, as shown. However, to cover and protect the seed 17 in this embodiment, the entire surface of the lower portion 14 of the tab 11 upon which the adhesive material 55 is coated, together with seed 17, is covered with a relatively thin layer 56 of suitable porous material, such as blotting paper, which is adhered to the adhesive 55. The porous layer 56 covers and protects the seed 17 during insertion of the lower end 14 of tab 11 into the soil, however, layer 56 becomes soft due to the moisture in the soil thus allowing emergence of the seedling. As seen in FIG. 8, the upper end 57 of layer 56 may project slightly above the soil level line 33, and a line indicating the level to which the tab 11 is to be inserted in the soil may be printed on layer 56, as at 58.

Referring now to FIG. 9, a plurality of the seed planting and marking devices 54 of FIG. 8 are preferably initially formed as an integral card 59. Herre, a sheet 60 of the plastic or other suitably stiff self-supporting material is provided having a longitudinal portion 61 of one surface coated with adhesive material 55 with seed 17 being adhered thereto at longitudinally spaced locations. A sheet 62 of relatively thin porous material, such as blotting paper, covers the lower portion 61 of sheet 60 which is coated with an adhesive material 55 and the seed 17, being adhered to the adhesive material 55. Transversely extending longitudinally evenly spaced apart separation lines 63 are then formed on the surface of sheet 60 upon which the coating of adhesive material 55 is applied in a press operation which also forms points 12, formation of the separation lines 63 cutting completely through the sheet 62 of porous material, as at 64. It will now be seen that the formation of the separation lines 63 between the locations of the seeds 17 defines the individual sheet planting and marking tabs 54 which can thus be readily separated one from another, as desired.

In a specific example of the embodiment of FIGS. 8 and 9, the individual tabs 54 are ½ inch wide, 2½ inches long with porous layer 56 being 1¼ inches long, the tab 11 being formed of polystyrene .020 inch thick and the porous material 56 being 120 lbs. Royal Worcester blotting paper (uncoated) .020 inch thick adhered to the lower portion 15 of tab 11 by Permacel adhesive No. 4128. As indicated, separation lines 63 and 64 and point 12 are cut in a press operation after the blotting paper sheet 62 has been applied to the plastic sheet 60. It will be readily apparent that other plastic materials, such as vinyl, and other porous materials, such as filter paper, may be employed.

It will be readily understood that in any of the embodiments of my invention, the porous materials, blotting paper, and/or adhesive employed in making up the tab or sheet as the case may be, may be impregnated with or contain suitable chemicals well known in the art which retard seedling "damping-off" and other diseases, and/or chemicals which promote germination and seedling growth. There are, of course, many commercially available adhesives which will serve the intended purpose of holding the seeds to the tab, it being merely necessary to employ an adhesive which does not have a deleterious effect on the seed or seedling, and which will provide satisfactory adherence with the seed and with the material from which the tab or sheet is formed without rotting, mildewing, or fermenting after it is moistened. Likewise, many commercially available adhesives are suitable for holding the protective covering in place, again the requirement being that the adhesive must not ferment, rot or mildew when moistened; additionally, these adhesives should not be readily soluble in water so that the protective covering on the tabs will be retained in place in order to maintain the predetermined environment immediately surrounding the seed. In addition to the Permacel adhesive No. 4128 referred to above, other suitable adhesives include a glue sold under the trademark "Pliobond," carpenter's glue, ordinary rubber cement, or ordinary liquid paste of the type used in paper work.

It will be readily apparent that in the case of all embodiments of my invention, the specific number of seeds which are adhered to the tab is controllable in production, and that proper moisture for the seeds is maintained by the porous materials used to make up the complete device. It will be readily apparent that my invention eliminates the previous difficulty in handling individual seeds during planting, and that the size of the seed being planted becomes altogether unimportant. It is further seen that seed planting, whether in individual locations, or in flats, is made extremely easy for anyone, and that the time used in planting with any of my devices is considerably less than was formerly required in conventional methods of planting.

In the case of all of the embodiments of my invention, it will be seen that the correct planting depth of the seed with respect to the soil level mark on the tab is controllable at will, and that watering of the soil after the seed tabs are inserted does not have to be done with great care since there is no danger of washing away small seeds. It will be readily comprehended that in contrast with prior planting methods, seeds do not have to be packaged in small envelopes for sale since the tab itself functions as a package; the tear-apart strip or card of tabs as shown in FIGS. 3 through 5, 6 and 9 particularly lends itself to merchandising. It will further be seen that with my improved seed planting and marking tab, the selected seed may be planted in the exact location where it is desired that the resulting plant grow, and that the part of the tab projecting above the soil may, as indicated in FIGS. 3 through 5, bear suitable identification of the kind of seed, color, etc. With the improved seed planting and marking tab of my invention, the care previously required in planting the seed at the correct depth and properly packing the soil around the seed is eliminated and since more than one seed may be retained on each tab, germination percentage is considerably increased in contrast with individual seed planting. It will also be readily seen that the cost of a card of attached marker-seed tabs is very low, and that the same tab configuration can have any kind of seed adhered thereto, thus lending production universality.

While I have described and illustrated specific embodiments of my invention, further modifications and improvements will occur to those skilled in the art, and I desire therefore in the appended claims to cover all modifications which do not depart from the spirit and scope of my invention.

What is claimed is:

1. A seed planting and marker device comprising a vertically elongated rigid tab proportioned to have one end driven into soil to a predetermined level with the other end thereof projecting upwardly above the soil, said one end of said tab having at least a portion of one surface thereof coated with a thin layer of adhesive material, and a predetermined number of seeds adhered to the surface of said layer.

2. A seed planting and marker device comprising: a vertically elongated rigid tab proportioned to have one end driven into soil to a predetermined level with the other end thereof projecting upwardly above the soil, said one end of said tab having at least a portion of one surface thereof coated with a thin layer of adhesive material, a predetermined number of seeds adhered to the surface of said layer; and means formed of relatively thin porous material secured to said one surface and covering said seed for protecting the same.

3. A seed planting and marker device comprising a plurality of vertically elongated tabs formed of a relatively thin sheet of rigid material, said tabs being edge-joined and adapted to be separated to form individual tabs, each of said tabs being proportioned to have one end thereof driven into soil to a predetermined level with the other end thereof projecting upwardly above the soil, each of said tabs having at least a portion of one surface of said one end thereof coated with a thin layer of adhesive material, each of said tabs having a predetermined number of seeds adhered to the surface of said adhesive material.

4. A seed planting and marker device comprising: a vertically elongated flat rigid tab proportioned to have one end driven into soil to a predetermined level with the other end thereof projecting upwardly above the soil, said one end of said tab having at least a portion of one surface thereof coated with a thin layer of adhesive material; a predetermined number of seeds adhered to the surface of said adhesive material; and a relatively thin layer of porous material coating said one end of said tab thereby covering said seed for protecting the same.

5. A seed planting and marker device comprising: a vertically elongated tab formed of a relatively thin sheet of rigid material and proportioned to have one end thereof driven into soil to a predetermined level with the other end thereof projecting upwardly above the soil, said one end of said tab having at least a portion of one surface thereof coated with a thin layer of adhesive material; a predetermined number of seeds adhered to said one surface; and a relatively thin layer of porous material covering said one surface of said one end of said tab and said seeds and adhered to the surface of said adhesive material.

6. The combination of claim 5 wherein said porous material is blotting paper.

7. The combination of claim 5 wherein said tab is formed of rigid relatively thin self-supporting plastic material.

8. A seed planting and marker device package comprising: a relatively thin sheet of rigid material, one surface of said sheet having a longitudinal portion thereof coated with a thin layer of adhesive material; a predetermined number of seeds adhered to said one surface at longitudinally spaced locations; and a relatively thin layer of porous material covering said one surface of said longitudinal portion and said seeds and adhered to the surface of said adhesive material; said sheet and said layer having transversly spaced separation lines formed therein between said seed locations defining individual vertically elongated seed planting and marker devices which may be separated one from the other, each of said individual devices being adapted to have its end which has one surface covered by said porous material driven into soil to a predetermined level with the other end thereof projecting upwardly above the soil.

9. A seed planting and marker device comprising: a vertically elongated tab formed of a relatively thin sheet of rigid material, and a relatively thin sheet of moisture absorbent material abutting said tab adjacent one end thereof, the facing surfaces of said sheets being adhered together, said tab being proportioned to have said one end driven into soil to a predetermined level with the other end thereof projecting upwardly above the soil, and a predetermined number of seeds disposed between said sheets and adhered to said facing surface of one of said sheets.

References Cited in the file of this patent
UNITED STATES PATENTS

| | | |
|---|---|---|
| 1,143,980 | McComb | June 22, 1915 |
| 1,380,253 | Rodger | May 31, 1921 |
| 2,197,594 | Rowell | Apr. 16, 1940 |
| 2,281,927 | Fischer | May 5, 1942 |
| 2,571,491 | Schindler | Oct. 16, 1951 |
| 2,776,634 | Morton | Jan. 8, 1957 |

FOREIGN PATENTS

| | | |
|---|---|---|
| 74,703 | Austria | Sept. 25, 1918 |
| 467,044 | France | Mar. 20, 1914 |
| 105,893 | Great Britain | May 3, 1917 |
| 705,926 | Great Britain | Mar. 24, 1954 |